United States Patent [19]

Bartoschek et al.

[11] Patent Number: 5,322,262
[45] Date of Patent: Jun. 21, 1994

[54] BEARING DEVICE FOR THE THREADED SLEEVE OF A VALVE STEM

[75] Inventors: Manfred Bartoschek, Frankenthal, Fed. Rep. of Germany; Primo Lovisetto, Vicenza, Italy

[73] Assignee: KSB Aktiengesellschaft, Frankenthal/Pflaz, Fed. Rep. of Germany

[21] Appl. No.: 730,868

[22] PCT Filed: Jan. 9, 1990

[86] PCT No.: PCT/EP90/00039

§ 371 Date: Aug. 29, 1991

§ 102(e) Date: Aug. 29, 1991

[87] PCT Pub. No.: WO90/08282

PCT Pub. Date: Jul. 26, 1990

[30] Foreign Application Priority Data

Jan. 21, 1989 [DE] Fed. Rep. of Germany ....... 3901702

[51] Int. Cl.$^5$ .................. F16K 31/50; F16C 19/10; F16C 33/58
[52] U.S. Cl. .................. 251/229; 74/25; 74/89.15; 74/424.8 VA; 251/267; 384/420; 384/615; 384/622
[58] Field of Search .............. 251/267, 268, 269, 229; 74/25, 89.15, 424.8 VA; 384/420, 615, 622

[56] References Cited

U.S. PATENT DOCUMENTS

| | | | |
|---|---|---|---|
| 611,472 | 9/1898 | Gillespie | 251/267 |
| 621,566 | 3/1899 | Hendy | 251/267 |
| 650,502 | 5/1900 | Bouse | 251/267 |
| 1,996,309 | 4/1935 | Simpson | 251/268 |
| 2,634,945 | 4/1953 | Hobbs | 251/267 |
| 2,780,233 | 2/1957 | Volpin | 251/267 |
| 2,871,069 | 1/1959 | Weber | 384/420 |
| 3,188,049 | 6/1965 | Zawacki et al. | 251/267 |
| 3,602,558 | 8/1971 | Reynolds | 384/420 |
| 4,120,543 | 10/1978 | Greene, Jr. et al. | 384/615 |
| 4,293,117 | 10/1981 | Mueller | 251/267 |
| 4,364,541 | 12/1982 | Chabat-Courréde et al. | 251/267 |
| 4,552,467 | 11/1985 | Takei et al. | 384/615 |
| 4,566,812 | 1/1986 | Takei et al. | 384/615 |
| 4,674,759 | 6/1987 | Parker | 384/420 |
| 4,750,709 | 6/1988 | Kolenc et al. | 251/267 |
| 4,773,442 | 9/1988 | Lephilibert | 251/267 |

*Primary Examiner*—George L. Walton
*Attorney, Agent, or Firm*—Darby & Darby

[57] ABSTRACT

A gate valve has a housing for a valve seat, and an attachment which extends outwardly from the housing and constitutes an extension thereof. A cap is secured to the attachment at the end of the latter remote from the housing, and a plate which traverses the attachment is held between the cap and the attachment. An externally threaded, non-rotary valve stem extends between the cap and the housing and passes through the plate. The valve stem meshes with an internally threaded, rotatable sleeve which receives the valve stem and is connected to a handwheel. The sleeve is at least partially confined by the cap and the plate, and both the cap and the plate are provided with bearing locations for the sleeve.

11 Claims, 3 Drawing Sheets

BEARING DEVICE FOR THE THREADED SLEEVE OF A VALVE STEM

The invention relates to a device for transferring the rotational movement generated by a drive to a non-rotary stem of a shutoff valve.

In shutoff valves where the conditions of use require external, non-rotary stem threads, a threaded sleeve which surrounds the stem is necessary in order to transfer the rotational motion of a drive to the stem. The threaded sleeve in cast iron and steel valves is normally received by a machined hub. The hub is carried by an attachment which is disposed on the valve housing and has the form of a yoke (KSB Armaturen-Handbuch, 1965).

In a shutoff valve with a sheet metal housing, an attachment constituted by a yoke can be employed only through the use of an expensive welded construction. However, this conflicts with the requirement, imposed specifically on sheet metal valves, for easily manufactured individual components joined to one another by a few weld seams.

SUMMARY OF THE INVENTION

It is accordingly an object of the invention to provide a bearing device for the threaded sleeve of the stem of a shutoff valve which eliminates the known yoke configuration and is especially suitable for sheet metal manufacture.

This object is achieved by an attachment consisting of a rotationally symmetrical body and carrying the lower bearing location for the threaded sleeve, and a bearing cap connected to the attachment of a flange and containing the upper bearing location.

BRIEF DESCRIPTION OF THE DRAWINGS

The invention is described in greater detail with reference to the accompanying drawings in which.

DESCRIPTION OF THE PREFERRED EMBODIMENTS

Figure 1:
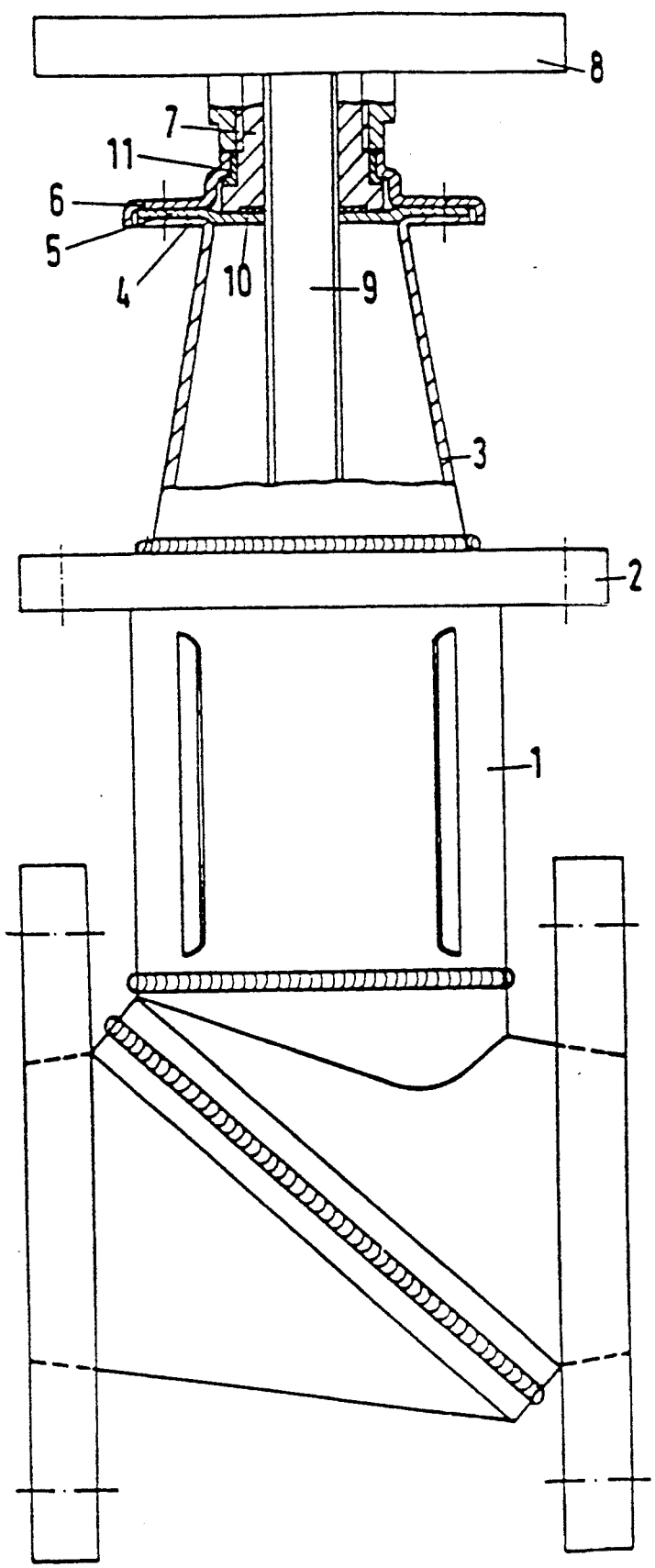
FIG. 1 shows a shutoff valve sectioned in the region of the stem drive.

The shutoff valve illustrated in FIG. 1 has a sheet metal housing 1 which is closed off from the atmosphere by a cover secured by means of a flange 2. An attachment 3 is disposed on and welded to the cover. The attachment 3 has a flange 4 which serves as a connection to a bearing disc 5 resting on the attachment 3, and as a connection to a bearing cap 6.

The bearing disc 5 and bearing cap 6 embrace a threaded sleeve 7 which is connected to a handwheel 8. An ascending, non-rotary stem 9 is surrounded by the threaded sleeve 7 which transfers a rotational movement generated by the handwheel 8 to the stem 9 in such a manner that the latter and a closure non-illustrated element—connected thereto are raised or lowered depending upon the direction of rotation.

Figure 2:
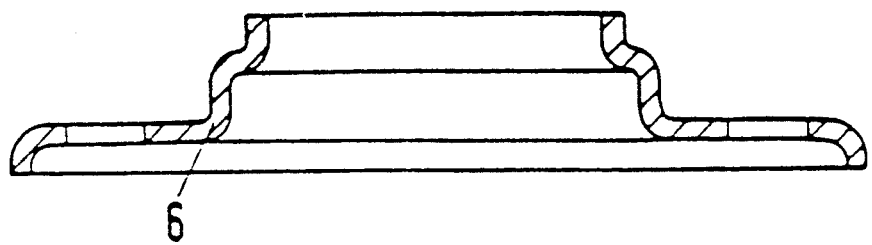
FIGS. 2 and 3 show enlarged individual views of the components forming the bearing locations for the stem drive of FIG. 1, and FIGS. 4 and 5 show different embodiments of the bearing locations.
Figure 3:
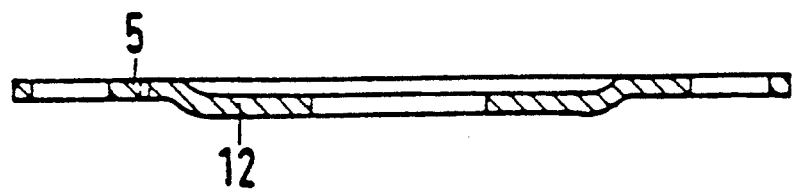

In the embodiment of FIGS. 1 to 3, the threaded sleeve 7 is supported by additional plain bearing elements 10 and 11 which are fixed to the threaded sleeve 7. Such plain bearing elements can likewise be provided on the bearing disc 5 or the bearing cap 6. They can consist of individual members which may, for example, be adhesively connected to the component carrying them; they can also be formed by spraying an antifriction material onto one or both sliding components or can be loosely connected therewith.

The bearing disc 5, which in the exemplary embodiment of FIGS. 1 to 3 is provided with a recessed portion or a protuberance 12 serving for centering in the attachment 3, acts as an axial bearing during backward flow through the shutoff valve. A sleeve-like upper region or a recessed portion of the bearing cap 6 assumes the axial bearing function during forward flow through the valve and the radial bearing function during flow in any direction.

Figure 4:
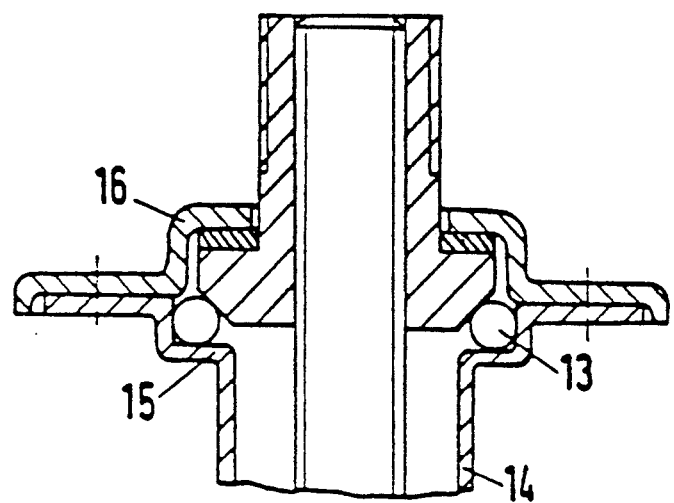

In the embodiment illustrated in FIG. 4, a bearing collar is eliminated. The axial bearing function during backward flow through the valve is here assumed by a ball bearing whose balls 13 are supported on a shoulder 15 provided in the attachment 14. A bearing cap 16 acts as an axial bearing during forward flow through the valve, as well as a radial bearing, in the manner described above.

Figure 5:
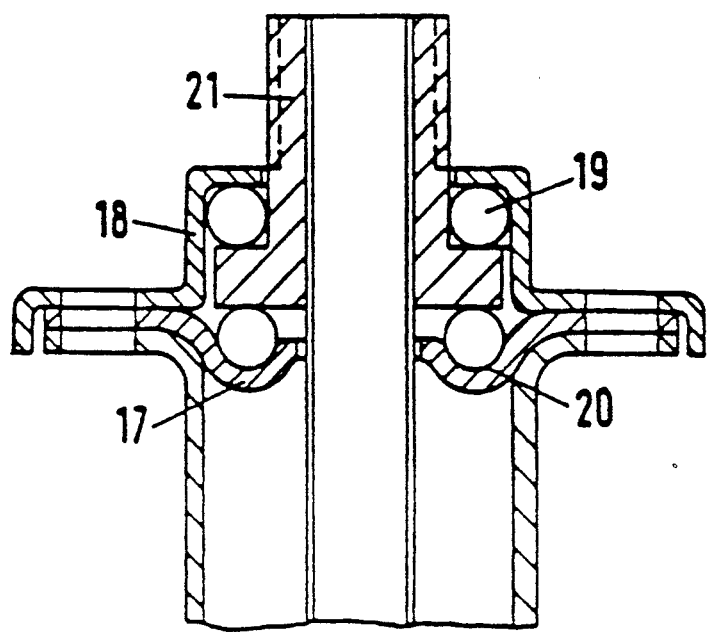

The embodiment shown in FIG. 5 has a bearing disc 17 and a bearing cap 18 which are likewise made of sheet metal. Support is here provided by a ball bearing whose balls 19 are disposed in a circular corrugation 20 of the bearing disc 17 and in a compartment defined by the threaded sleeve 21 and the bearing cap 18.

We claim:

1. A valve comprising: a valve housing; a dynamically balanced attachment to said housing extending outwardly therefrom and having an axis of symmetry; said attachment having a flange portion at an end remote from said valve housing, a cap-like member secured to said flange portion of said attachment, said attachment and said cap-like member comprising sheet metal; a discrete bearing disc member secured between said flange portion of said attachment and said cap-like member; a valve actuating member extending between said cap-like member and said housing; and a threaded rotatable sleeve which receives and is in driving engagement with said actuating member to axially move said actuating member, said bearing disc member including an annular portion recessed in an axial direction towards said housing, an axial thrust bearing member being disposed and supported between said recessed portion of said bearing disc member and said sleeve such that said annular recessed portion of said bearing disc member acts as an axial thrust bearing surface for the threaded sleeve when fluid flows through said valve in a first direction, said cap-like member including an annular portion recessed in an axial direction away from said housing, an axial thrust and radial bearing member being disposed and supported between said recessed portion of said cap-like member and said sleeve such that said annular recessed portion of said cap-like member acts as an axial thrust bearing surface for the threaded sleeve when fluid flows through said valve in a second direction, which is substantially opposite to said first direction, and acts as a radial bearing surface for the threaded sleeve when fluid flows through said valve in said first and second directions.

2. The valve of claim 1, wherein said actuating member is fixed against rotation.

3. The valve of claim 1, wherein said sleeve is provided with a collar and one of said thrust bearing member and said axial thrust and radial bearing member is disposed to one side of said collar.

4. The valve of claim 3, wherein the other of said thrust bearing member and said axial thrust and radial bearing member is disposed on another side of said collar opposite said one side.

5. The valve of claim 1, wherein said cap-like member is provided with a flange and said flanges are secured to one another.

6. The valve of claim 1, wherein at least one of said bearings includes an antifriction layer.

7. The valve of claim 1, wherein said bearings are ball bearings.

8. The valve of claim 1, wherein said thrust bearing is a ball bearing and said axial thrust and radial bearing is a plain bearing.

9. The valve of claim 8, wherein said housing comprises sheet metal.

10. The valve of claim 8, wherein said bearings are plain bearings.

11. A valve comprising: a valve housing; an attachment to said housing extending outwardly therefrom and having an axis of symmetry; said attachment having a flange portion at an end remote from said valve housing, a cap-like member secured to said attachment; a discrete bearing disc member secured between said flange portion of said attachment and said cap-like member; a valve actuating member extending between said cap-like member and said housing, said actuating member being spaced from and defining a gap with at least one of said attachment and said cap-like member, and said bearing disc member including an annular portion recessed in said gap in an axial direction towards said housing which at least partly surrounds said actuating member and is unsupported from a direction towards said housing; and a threaded rotatable sleeve which receives and is in driving engagement with said actuating member to axially move said actuating member, an axial thrust bearing member being disposed and supported between said recessed portion of said bearing disc member and said sleeve such that said annular recessed portion of said bearing member acts as an axial thrust bearing surface for the threaded sleeve when fluid flows through said valve in a first direction, said cap-like member including an annular portion recessed in an axial direction away from said housing, an axial thrust and radial bearing member being disposed and supported between said recessed portion of said cap-like member and said sleeve such that said annular recessed portion of said cap-like member acts as an axial thrust bearing surface for the threaded sleeve when fluid flows through said valve in a second direction, which is substantially opposite to said first direction, and acts as a radial bearing surface for the threaded sleeve when fluid flows through said valve in said first and second directions.

* * * * *